US008100334B2

(12) United States Patent
Rosset

(10) Patent No.: US 8,100,334 B2
(45) Date of Patent: Jan. 24, 2012

(54) SECURITY MEMBER HAVING A RELATIVELY SMALL FORMAT AND COMPRISING A THROUGH-HOLE AND SHEET COMPRISING THE SAME

(75) Inventor: Henri Rosset, Le Pin (FR)

(73) Assignee: ARJOWIGGINS, Issy les Moulineaux (FR)

( * ) Notice: Subject to any disclaimer, the term of this patent is extended or adjusted under 35 U.S.C. 154(b) by 25 days.

(21) Appl. No.: 12/373,787

(22) PCT Filed: Aug. 6, 2007

(86) PCT No.: PCT/FR2007/051782

§ 371 (c)(1), (2), (4) Date: Mar. 16, 2009

(87) PCT Pub. No.: WO2008/017784

PCT Pub. Date: Feb. 14, 2008

(65) Prior Publication Data

US 2010/0001506 A1 Jan. 7, 2010

(30) Foreign Application Priority Data

Aug. 8, 2006 (FR) ..................................... 06 07237

(51) Int. Cl.
*G06K 19/00* (2006.01)

(52) U.S. Cl. .............. 235/487; 287/72; 287/85; 287/87; 287/94; 340/572.6

(58) Field of Classification Search .................. 235/487; 287/72, 85, 87, 94; 340/572.6
See application file for complete search history.

(56) References Cited

U.S. PATENT DOCUMENTS

| | | | | |
|---|---|---|---|---|
| 4,037,007 | A | 7/1977 | Wood | |
| 7,378,973 | B2 * | 5/2008 | Dixon et al. | 340/572.8 |
| 2002/0027359 | A1 * | 3/2002 | Cobben et al. | 283/67 |
| 2005/0151368 | A1 * | 7/2005 | Heim | 283/72 |
| 2005/0230071 | A1 | 10/2005 | Attenberger et al. | |
| 2006/0006236 | A1 * | 1/2006 | Von Fellenberg et al. | 235/458 |
| 2007/0090196 | A1 | 4/2007 | Vast et al. | |
| 2007/0164555 | A1 | 7/2007 | Mang et al. | |
| 2008/0164690 | A1 * | 7/2008 | Heierli et al. | 283/87 |
| 2009/0261572 | A1 * | 10/2009 | Bleikolm et al. | 283/85 |
| 2010/0117350 | A1 * | 5/2010 | Auslander et al. | 283/85 |

FOREIGN PATENT DOCUMENTS

| | | | |
|---|---|---|---|
| EP | 0 342 929 | A1 | 11/1989 |
| EP | 0 544 611 | A1 | 6/1993 |
| EP | 0 546 917 | A1 | 6/1993 |
| EP | 1 253 241 | A2 | 10/2002 |
| EP | 1617353 | A1 * | 1/2006 |
| WO | WO 2005/003458 | A1 | 1/2005 |
| WO | WO 2005/026440 | A1 | 3/2005 |
| WO | WO 2005/077622 | A2 | 8/2005 |
| WO | WO 2005/078192 | A1 | 8/2005 |

* cited by examiner

*Primary Examiner* — Allyson Trail
(74) *Attorney, Agent, or Firm* — Oliff & Berridge, PLC

(57) ABSTRACT

A flat security member having a relatively small format, such as a thin board, including at least one through-hole and a method for producing a flat security member. A sheet material having a flat security member and a security document or an item to be authenticated having the sheet material.

37 Claims, 2 Drawing Sheets

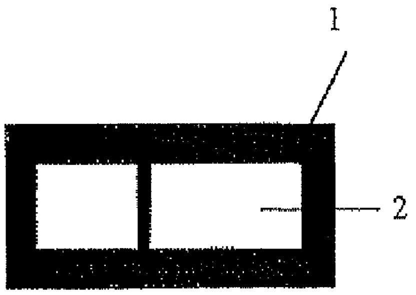
Figure 1
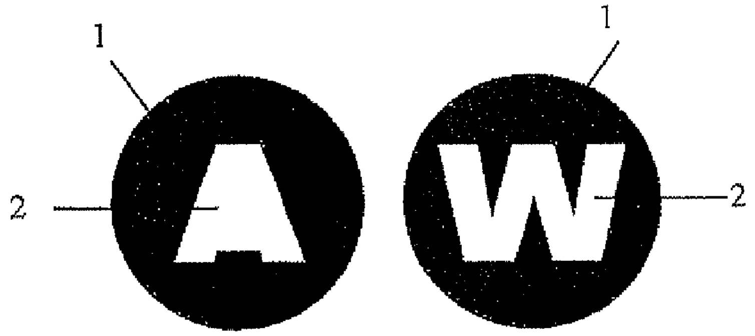
Figure 2a
Figure 2b
Figure 2
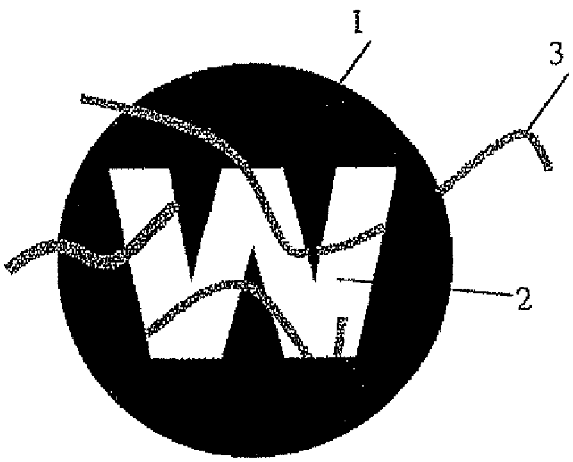
Figure 3

SECURITY MEMBER HAVING A RELATIVELY SMALL FORMAT AND COMPRISING A THROUGH-HOLE AND SHEET COMPRISING THE SAME

The invention relates to security elements that are flat and of relatively small format, such as small boards, and a material containing them, the security documents manufactured from this material and the method of producing said elements.

In security documents there are security elements of small format, called small boards, making it possible to authenticate said documents. Said security elements are similar to confetti having various shapes, for example circular or hexagonal shapes. They have a size of the order of 1 to 6 mm.

These elements may notably have one or more of the following surface optical effects: interferential effects such as iridescence or dichroism, effects associated with the reflection or the polarization of light or else luminescent effects and in particular fluorescent effects. These effects may notably be obtained by printing, full tones and/or designs, or inclusion of specific compounds. Furthermore, these security elements may comprise authentication agents such as chemical reactants or liquid crystals for example.

These elements may be obtained from plastic sheets and/or from paper of low grammage. When they are based on a sheet of paper, it may be a sheet called overlay, usually used as a protective sheet in the field of decorative laminate papers; this sheet containing an agent of resistance to the damp state, not opacified and of low grammage, of the order of 25 to 40 g/m$^2$, is conventionally manufactured by dripping of an aqueous suspension of not very refined cellulose fibers, of the order of 20° SR (degrees Schopper-Riegler) This then gives a sheet of a thickness varying between 50 and 100 μm. It may also comprise an agent improving the wettability and/or a surface heat-sealing varnish to promote the hold of said elements in the material that will contain them. Other types of papers may be used, as well as plastic sheets or complexes made from the sheet materials cited above.

Said security elements are obtained from these sheets, notably by die-stamping, dies optionally placed on metal cylinders, by perforation thanks to punches, pins or needles, by cutting achieved using a laser. They may also be produced according to patent application WO 2005/077622, by rotary cutting of sheets using a succession of synchronized cutting cylinders and comprising respective cutting rules that complement one another so as to form a figure corresponding to the shape of said security elements.

There are different methods of incorporating security elements into a medium.

In the case of a sheet of paper as the medium, the security elements may be scattered, for example as described in patent application WO 2005/003458, that is to say that the elements are added and dispersed upstream of the headbox of the paper machine, in the aqueous suspension containing notably cellulose fibers and/or synthetic fibers and optionally other additives routinely used in paper technology, the suspension then being dripped onto the forming fabric of the machine to form the sheet which is then pressed and then dried, with optionally a surface treatment, depending on the usual papermaking method. This gives a sheet within which said security elements are distributed randomly.

According to a second method used, notably when the paper machine has at least one flat table, said security elements are inserted in a strip by a jet placed above the fibrous suspension dripping onto the forming fabric of the paper machine. This sheet will then be pressed and then dried, with optionally a surface treatment. The latter method is described for example in patent application EP 1253241. The elements are therefore placed in a strip in the sheet.

According to a third method used when the paper machine has at least one round form, said security elements are inserted in a strip by a feed duct leading into the forming tank close to the suction cylinder and before the beginning of dripping of the fibrous suspension.

Security documents can therefore be produced from the media thus formed; they are notably described in patent applications EP 342929, EP 546917, EP 544611 and U.S. Pat. No. 4,037,007.

These security elements have the advantage of being able to carry a large number of securities, amongst which it is possible notably to cite fluorescent printing, but they notably have the disadvantages of creating added thicknesses and problems during printing. In particular, it has been noted that these security elements are torn during the printing of documents or sheets containing them, which causes printing faults and clogging of, and even damage to, the machines used for printing.

The object of the invention is to remedy the cited problems notably that of tearing of the flat and relatively small security elements.

Another object of the invention is to increase the security of documents containing such elements.

The Applicant has demonstrated that this tearing problem may arise notably from the security elements being too large, their poor adhesion/hold relative to the medium in particular due to a bad fibrous covering.

The Applicant therefore proposes security elements that are flat and of relatively small format and whose hold on the medium for which they are intended is improved.

Accordingly it proposes flat and relatively small security elements comprising a through-hole. Said through-hole allows a better tangle of said security elements within the fibrous medium because the fibers of the medium can pass through this hole and therefore create more connections between the medium and the element. Furthermore, since the elements are better held and therefore better buried in the medium, thinner added thicknesses are obtained than with the elements of the prior art.

In addition, the protection of the documents comprising said elements is improved by the better hold of said security elements within the fibrous medium and by the presence of said through-hole, the shape of which constitutes an added protection against forgery. The protection of the documents will also be enhanced by the fact that said through-hole can allow the writing or production of alphanumeric characters or other designs helping to authenticate said documents.

The invention therefore relates to a security element that is flat and of relatively small format, such as small boards, characterized in that it comprises at least one through-hole.

According to a particular instance of the invention, the external shape of the security element is geometric, notably circular, hexagonal, triangular, oval, square, rectangular, star-shaped or with curved edges.

According to a particular instance of the invention, said through-hole is of geometric shape, notably circular, hexagonal, triangular, oval, square, rectangular, star-shaped or with curved edges.

According to a particular instance of the invention, said security element has a substrate with a base of a fibrous sheet, a plastic film or a fibrous sheet/plastic film complex, notably an overlay paper or a polyester film.

According to a particular instance of the invention, the thickness of said security element ranges between 10 and 100 μm. In the case of an element based on a fibrous sheet, said thickness is preferably between 40 and 70 μm and more preferably between approximately 55 and 65 μm, and if the element is based on a plastic film, said thickness preferably ranges between 20 and 50 μm and more preferably between approximately 25 and 35 μm.

According to a particular instance of the invention, the external dimensions (diameter or width or length) of said element range between 2 and 6 mm, and preferably between 2.5 and 4 mm. In general, the dimensions of said element are such that it can be included in a circle with a diameter having the dimensions indicated here.

According to a particular instance of the invention, the dimensions of the through-hole range between 0.5 and 4.5 mm, and preferably between 1 and 1.5 mm, the dimensions evidently being also adapted to the size of the element. In general, the dimensions of said through-hole are such that it can be included in a circle with a diameter having the dimensions indicated here.

According to a particular instance of the invention, said security elements comprise prints which may allow the authentication of a document containing said elements. For example, they may be prints as shown in patent application WO 2005/078192 which describes a flat security element having a recto face and a verso face, and having a relatively small format, such as small boards, comprising at least on one of its faces at least one located authentication design and/or one authentication design resulting from the combination and/or superposition of one design on its recto face and of one on its verso face, at least one of said authentication designs being at least partly observable in transmitted light.

According to the invention, more generally said prints may be a full tone covering the whole surface of said security element or a design. In the case of a printed design, said design may complement the shape of said through-hole. For example, said through-hole has the shape of the upper portion of the letter "A", the lower portion being complemented by a fluorescent printed design. This gives a security element having a protection that is increased and can be authenticated by observation in transmitted light and under ultraviolet rays.

According to a particular instance of the invention, said security element comprises at least two through-holes. More particularly, said through-holes form a code which may be a combination of alphanumeric characters, ideograms, figures or bars for example such as a bar code.

It is for example possible to produce a symbol representing the body issuing the security documents comprising said security elements or a specific text on said security elements. Said symbol or said text is then observed in transmitted and/or reflected light, notably under ultraviolet rays, on said security documents. In particular, the observation of said security element in transmitted light reveals said symbol or said text as a negative, by contrast between the opaque zones of said security element and the transparent zones formed by said through-hole.

Preferably said security elements have a geometric shape which has portions promoting their coupling or tangling within the substrate. In the case of a fibrous substrate, because of said through-hole and the dimensions of the security element, which are of the order of magnitude of the length of the cellulose and/or synthetic fibers used in papermaking, namely between 0.7 and 3 mm, the fibers tangle more easily around said security elements, thereby improving their tear strength. This type of phenomenon is notably obtained by using security elements as described via the following particular instances.

According to a particular instance of the invention, the external shape of said security element and/or the shape of said through-hole has portions which, relative to the dimensions of said security element, are thin and elongated.

According to another particular instance of the invention, the external shape of said security element and/or the shape of said through-hole has excrescences and/or protuberances which, relative to the dimensions of said security element, are thin and elongated.

A star shape with thin branches, a thin ring (a round security element with a round perforation) or else a geometric shape with several acute angles notably satisfy this condition.

The invention also relates to the method of manufacturing said security element, said security element according to its external shape or said through-hole being cut out by die-stamping, dies optionally placed on metal cylinders or, by perforation with the aid of punches, pins or needles or with the association of male and female metal shapes, by laser cutting of a sheet or of a film or else by a method of rotary cutting, of a sheet or of a film, using a succession of cutting cylinders that are synchronized and comprise respective cutting rules which complement one another so as to form a figure corresponding to the shape of said security elements notably as described in patent application WO 2005/077622.

More particularly, said through-hole is cut simultaneously with the cutting of the external shape of said security element.

The invention also relates to a sheet material comprising the security element described above.

According to a particular instance of the invention, said sheet material is a fibrous sheet based on cellulose fibers (in particular cotton fibers) and/or organic synthetic fibers and/or optionally mineral fibers. Said fibrous sheet may notably be produced on a paper machine having at least one flat table and/or at least one round form.

According to a particular instance of the invention, said sheet material is a security sheet comprising at least one other security element. This other security element may be notably chosen from the following list: watermark, security thread, fibers or pigments that can be seen or detected under specific radiation, for example under UV or infrared radiation, or else optically variable devices such as a hologram or a design print for example using luminescent, interferential for example iridescent, thermochromic, magnetic, etc. inks.

According to a particular instance of the invention, said security elements are scattered in the sheet material.

According to another particular instance of the invention, said security elements are placed in a strip. In particular, this placement in a strip is carried out, notably when said security elements form a code, so as to represent the symbol of said body.

According to a particular instance of the invention, said material comprises several types of said flat elements and they form a code. It is possible, for example, to insert into the material three types of security elements of which the respective through-holes represent three different characters, these three characters being the initials of the body that is the owner of said material forming a security sheet.

The invention also relates to a security document comprising said sheet material described in the above paragraphs. The level of security of said document is increased by the presence of through-holes and by their shapes which make the production of forgeries more difficult. This security element is also particularly valuable because it can be seen in transmitted or reflected light, under ambient or fluorescent lighting. Said security document containing said security elements of the invention is therefore easily authenticatable.

Said security document may notably be a means of payment, such as a bank note, a check or a restaurant ticket, an identity document such as an identity card, a visa, a passport or a driving license, a lottery ticket, a security label, a transport ticket or an entrance ticket for cultural or sporting events.

The invention may also apply to an article to be authenticated such as a packaging, notably a packaging for medicines or for foodstuffs or for perfumes or for electronic parts or for spare parts notably for a means of transport, a sheet used in the medical or hospital field, notably a paper used to make sterilization packages, or else an art paper, for example a watercoloring paper.

The invention will be better understood on reading the following nonlimiting examples and figures.

In the drawings, for the purpose of clarity, the relative proportions of the various elements represented have not always been observed, the views being schematic.

EXAMPLES

Example 1

According to the Invention

Consideration is given to the production of a security element according to the invention and of a security paper containing it, said element being of rectangular shape and based on a fibrous sheet.

A paper sheet of the overlay type is manufactured according to the conventional method by dripping an aqueous suspension of not very refined cellulose fibers, of the order of 20° SR (degree Schopper-Riegler), the sheet not being opacified and containing an agent for resistance to the humid state, and having a thickness of 50 μm. This sheet has a certain transparency.

The recto and verso faces are printed with a blue fluorescent color. An agent is then applied to the surface for improving their wettability and a heat-sealing varnish is applied making it easier for them to hold in the paper.

The sheet thus obtained is then cut into small fibers that are flat and rectangular, with a width of 4 mm and a length of 2 mm. The perforations are produced simultaneously with this cutting operation, by stamping with metal cylinders furnished with dies, in the shape of two rectangles. The respective dimensions of thee two rectangles are as follows (height× width): 1×1.2 mm 1×1.8 mm. The small fibers thus obtained are shown in FIG. 1 described below.

These security elements are then scattered in the pulp intended to manufacture a security paper and then, on a papermaking machine according to the techniques known to those skilled in the art, the sheet, which optionally contains other known security elements, for example a security thread and/or a watermark, is manufactured.

The resulting security paper comprises several security elements of the invention as described above. Said security elements have a fluorescent coloring under UV illumination and looking at them in transmitted light reveals the shape of the hole made in the security elements.

As a variant, said security elements described above are inserted in a strip into the sheet of paper during its manufacture. Observation under ultraviolet rays of the security document manufactured and then printed based on said sheet reveals, inside a strip 2 cm wide and 5 cm away from one edge of said document, said rectangular, perforated security elements.

Example 2

According to the Invention

Consideration is given to the production of a security element according to the invention, of circular shape and based on a plastic film, and of a security document containing it.

A reel of polyester film 30 μm thick is unwound and then the security elements represented in FIG. 2 are cut thanks to metal rollers. Said security elements comprising a through-hole in the shape of an "A" are stamped and likewise those comprising a through-hole in the shape of a "W" are produced apart.

Then separately, the two types of security elements are inserted into a sheet respectively in two strips 1.5 cm wide so that, once the security document is finished, said strips are respectively 2 and 6 cm away from its left edge. The insertion of said security elements is carried out by laminar flow over the security sheet being formed. This security sheet is then pressed and then dried and the security sheet shown in FIG. 4 and described below is obtained.

DESCRIPTION OF THE FIGURES

FIG. 1 represents a front view of a rectangular security element that is the subject of the invention.

FIGS. 2*a* and 2*b* represent a front view of two circular security elements (an "A" in FIG. 2*a* and a "W" in FIG. 2*b*) that are the subject of the invention.

FIG. 3 represents schematically the fibrous tangle across one of the security elements of the invention represented in FIG. 2.

Figure 4:
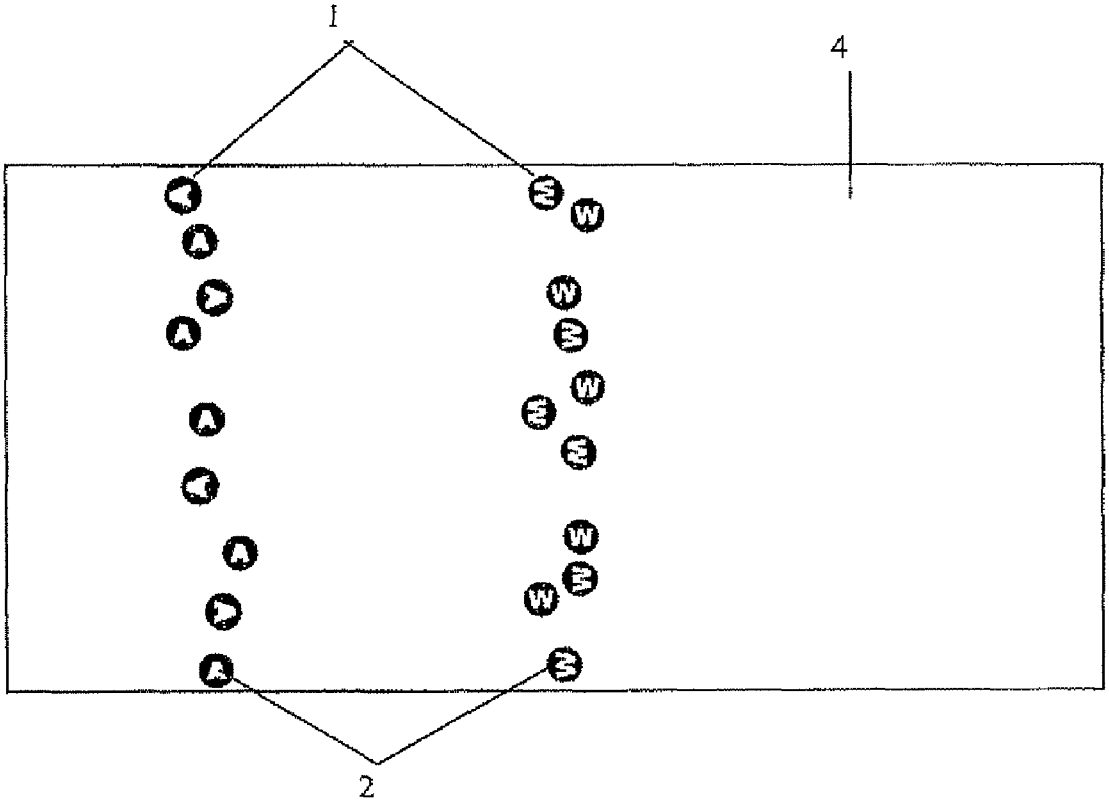
FIG. 4 represents a front view of a security sheet containing the security elements that are the subject of the invention.

The security element 1 shown in FIG. 1 is rectangular with dimensions of 2×4 mm and it has two rectangular through-holes 2 with respective dimensions of 1×1.2 mm and 1×1.8 mm. This element comprises a print on each of its faces with a blue fluorescent ink.

In FIG. 2, the through-holes 2 produced in the security elements 1 that are flat and of relatively small format are alphabetical characters: respectively an "A" in FIG. 2*a* and a "W" in FIG. 2*b*. The diameter of the security elements 1 of the invention shown in this figure is 4 mm and the through-holes 2 have dimensions (height and width) ranging between 2 and 3 mm.

The schematic representation of FIG. 3 shows how the through-hole 2 allows, via the fibrous tangle, a better hold of the security element within a fibrous medium such as a sheet of paper. Specifically, the fibers 3 have lengths of the order of 1 millimeter (between 0.7 and 3 mm) which allow them to pass through the through-hole 2, above and below the security element 1 because the latter has dimensions of the same order of magnitude as said fibers 3. Said security element 1 is consequently better incorporated into the fibrous medium into which it is incorporated.

In FIG. 4, the security elements 1 of the invention shown in FIG. 2 and comprising through-holes 2 have been incorporated as a strip into a sheet of paper 4 during its manufacture. They thus constitute the code "AW" which can be observed in transmitted light and/or reflection under ambient and/or ultraviolet lighting.

The invention claimed is:

1. A small-format security element that is flat and comprises at least one through-hole, the small-format security element being configured for incorporation with a document, wherein external dimensions of the small-format security element range between 2 mm and 6 mm and wherein the small-format security element comprises at least one printed element on at least one face of the small-format security element.

2. The small-format security element as claimed in claim 1, wherein an external shape of the small-format security element is of polygonal form or a shape selected from the group consisting of circular, hexagonal, triangular, oval, square, rectangular, star-shaped and curved edges.

3. The small-format security element as claimed in claim 1, wherein the through-hole is of a geometric shape selected from the group consisting of circular, hexagonal, triangular, oval, square, rectangular, star-shaped and curved edges.

4. The small-format security element as claimed in claim 1, wherein the small-format security element comprises a substrate with a base of a fibrous sheet, a plastic film or a fibrous sheet/plastic film complex.

5. The small-format security element as claimed in claim 4, wherein the substrate is an overlay paper or a polyester film.

6. The small-format security element as claimed in claim 1, wherein a thickness of the small-format security element ranges between 10 μm and 100 μm.

7. The small-format security element as claimed in claim 1, wherein dimensions of the through-hole range between 0.5 μm and 4.5 mm.

8. The small-format security element as claimed in claim 1, wherein the printed element is a design supplementing a shape of the through-hole.

9. The small-format security element as claimed in claim 1, wherein the small-format security element comprises at least two through-holes forming a code.

10. The small-format security element as claimed in claim 1, wherein an external shape of the small-format security element and/or of the through-hole comprises portions that are elongated and thin relative to dimensions of the small-format security element.

11. The small-format security element as claimed in claim 1, wherein an external shape of the small-format security element and/or of the through-hole comprises excrescences and/or protuberances that are elongated and thin relative to dimensions of the small-format security element.

12. A method of manufacturing the small-format security element as claimed in claim 1, the method comprising:

cutting at least one of the through-hole or the small-format security element according to an external shape of the small-format security element using a method selected from the group consisting of:
- die-stamping,
- stamping with metal cylinders furnished with dies,
- perforation with the aid of punches, pins or needles or with the association of male and female shapes,
- laser cutting of a sheet or of a film,
- rotary cutting a sheet or of a film, and
- a succession of cutting cylinders that are synchronized and comprise respective cutting rules that complement one another, to form a figure corresponding to the shape of the small-format security element and/or of the through-hole.

13. The method of manufacturing small-format security element according to claim 12, wherein the through-hole is cut simultaneously with the cutting of the external shape of the small-format security element.

14. A sheet material comprising at least one of the small-format security element according to claim 1.

15. The sheet material as claimed in claim 14, wherein the small-format security element is located in a strip.

16. The sheet material as claimed in claim 14, wherein the sheet material comprises several different types of the small-format security elements, the several different types of small-format security elements forming a code.

17. The sheet material as claimed in claim 14, wherein the sheet material is a security document selected from the group consisting of a monetary unit, an identity document, a lottery ticket, a security label, a transport ticket and an entrance ticket for cultural or sporting events.

18. The sheet material as claimed in claim 14, wherein the sheet material comprises small-format security elements having a geometric shape that has portions promoting coupling or tangling of the small-format security elements within a substrate of the sheet material.

19. The sheet material as claimed in claim 14, wherein the sheet material comprises small-format security elements spread in pulp used to manufacture the sheet material.

20. The sheet material as claimed in claim 14, wherein the at least one through-hole of the at least one small-format security element allows a fibrous medium of the sheet material to hold the at least one small-format security element within the sheet material.

21. A sheet material comprising at least one small-format security element that is flat and comprises at least one through-hole, wherein external dimensions of the small-format security element range between 2 mm and 6 mm and wherein the sheet material is a fibrous sheet based on at least one of cellulose fibers, organic synthetic fibers, and/or mineral fibers.

22. The sheet material as claimed in claim 21, wherein an external shape of the small-format security element is of polygonal form or a shape selected from the group consisting of circular, hexagonal, triangular, oval, square, rectangular, star-shaped and curved edges.

23. The sheet material as claimed in claim 21, wherein the through-hole is of a geometric shape selected from the group consisting of circular, hexagonal, triangular, oval, square, rectangular, star-shaped and curved edges.

24. The sheet material as claimed in claim 21, wherein the small-format security element comprises a substrate with a base of a fibrous sheet, a plastic film or a fibrous sheet/plastic film complex.

25. The sheet material as claimed in claim 24, wherein the substrate is an overlay paper or a polyester film.

26. The sheet material as claimed in claim 21, wherein a thickness of the small-format security element ranges between 10 μm and 100 μm.

27. The sheet material as claimed in claim 21, wherein dimensions of the through-hole range between 0.5 μm and 4.5 mm.

28. The sheet material as claimed in claim 21, wherein the small-format security element comprises at least two through-holes forming a code.

29. The sheet material as claimed in claim 21, wherein an external shape of the small-format security element and/or of the through-hole comprises portions that are elongated and thin relative to dimensions of the small-format security element.

30. The sheet material as claimed in claim 21, wherein an external shape of the small-format security element and/or of the through-hole comprises excrescences and/or protuberances that are elongated and thin relative to dimensions of the small-format security element.

31. The sheet material as claimed in claim 21, wherein the small-format security element is located in a strip.

32. The sheet material as claimed in claim 21, wherein the sheet material comprises several different types of the smallformal security elements, the several different types of small-format security elements forming a code.

33. The sheet material as claimed in claim 21, wherein the sheet material is a security document selected from the group consisting of a monetary unit, an identity document, a lottery ticket, a security label, a transport ticket and an entrance ticket for cultural or sporting events.

34. The sheet material as claimed in claim 21, wherein the sheet material comprises small-format security elements having a geometric shape which has portions promoting their coupling or tangling with the substrate of the sheet material.

35. The sheet material as claimed in claim 21, wherein the sheet material comprises small-format security elements spread in the pulp intended to manufacture the sheet material.

36. The sheet material as claimed in claim 21, wherein said at least one small-format security element has at least one through-hole allowing hold of said at least one small-format security element within the fibrous medium of the sheet material.

37. A sheet material comprising at least one small-format security element that is flat and comprises at least one through-hole, wherein external dimensions of the small-format security element range between 2 mm and 6 mm and wherein the sheet material is a security sheet comprising at least one additional security element.

* * * * *